US006826199B1

(12) United States Patent
Davidsson et al.

(10) Patent No.: US 6,826,199 B1
(45) Date of Patent: Nov. 30, 2004

(54) ARRANGEMENT, SYSTEM AND METHOD RELATING TO SWITCHING

(75) Inventors: Lars-Göran Davidsson, Göteborg (SE); Johan Mellgren, Munich (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 758 days.

(21) Appl. No.: 09/658,556

(22) Filed: Sep. 8, 2000

(30) Foreign Application Priority Data

Sep. 10, 1999 (SE) .............................................. 9903222

(51) Int. Cl.[7] .................................................. H04J 3/06
(52) U.S. Cl. ...................................... 370/518; 370/538
(58) Field of Search ................................ 370/535, 538, 370/539, 543, 518, 503, 509, 542

(56) References Cited

U.S. PATENT DOCUMENTS

| 4,855,999 | A | * | 8/1989 | Chao ........................... 370/538 |
| 4,905,228 | A | * | 2/1990 | Angell et al. ............... 370/538 |
| 4,949,339 | A | * | 8/1990 | Shimada et al. ............ 370/538 |
| 5,940,456 | A | * | 8/1999 | Chen et al. ................. 375/356 |

FOREIGN PATENT DOCUMENTS

| DE | 39 01 868 | 3/1990 |
| EP | 0 226 054 | 6/1987 |
| WO | 97/49210 | 12/1997 |

* cited by examiner

Primary Examiner—Andy Lee
(74) Attorney, Agent, or Firm—Roger S. Burleigh

(57) ABSTRACT

A switching arrangement for switching plesiochronous hierarchical digital traffic signals is provided. The arrangement includes a synchronous switching matrix with a number of input ports and output ports. Each input port may be connected to anyone of the output ports. The switching matrix uses a unitary reference clock with a frequency for synchronizing and clocking the traffic signals such that signals of at least two different hierarchical levels can be switched. Also presented is a system and a method for switching plesiochronous hierarchical digital traffic signals using a synchronous switching matrix for switching signals having at least two different hierarchical levels. An asynchronous switching means is provided for switching higher hierarchical level signals.

22 Claims, 10 Drawing Sheets

ARRANGEMENT, SYSTEM AND METHOD RELATING TO SWITCHING

BACKGROUND

The present invention relates to switching of plesiochrorous, hierarchical digital traffic signals. The invention also relates to a system for routing plesiochronous traffic signals carrying data on channels at hierarchically different data rate levels in a telecommunications node in a radio network still further the invention relates to a method of switching plesiochrorous, hierarchical digital traffic signals.

There is often a need to be able to switch separate, incoming traffic streams carrying data at different rates, particularly within the area of telecommunications. There is a European Standard for plesiochronous hierarchical traffic named CEPT (Conference of the European Postal and Telecommunication Administration) wherein E1 is the European digital transmission format as deviced by ITU-T (International Telecommunications Union). E1 is a signal format for carrying data at the rate of 2,048 Mbit/s and it can carry 32 channels of 64 kbps each. E2 comprises four multiplexed E1 signals with a data rate of 8,448 Mbps whereas E3 comprises 16 E1 signals with a data rate of 34,368 Mbps. In the North American T-1 format there are hierarchical levels with bit rates from 1,544 Mbps (T1, 3,152 Mbps being the next level etc.) The traffic, i.e. the bit stream has an inherent clock, a so called plesiochronous clock. The clock is therefore neither synchronous nor asynchronous There is often a need to switch separate, incoming streams of several channels carrying signal at a first, for example E1, bit rate as well as several channels with signals of a second bit rate, e.g. E2 signals in a flexible way to form new channels or new signals. Of course the need is the same for the above mentioned T1 and T2 signals or more generally any hierarchically different signals.

As an example, there may be a need to switch four E1 channels to a multiplexer in which they are multiplexed to form one E2 channel. In another example there may be a need to switch one E2 channel to a demultiplexer where it is demultiplexed to form four E1 channels. In yet another example there might be a need to switch three E1 channels to a multiplexer in which they are multiplexed into one E2 channel, the missing fourth E1 channel then being represented by a synthesized channel not carrying any useful information.

The above examples only illustrate some combinations that may be wanted and often there is a need for other combinations of multiplexing and demultiplexing traffic channels of different hierarchical levels.

Since a switching which is as flexible as possible is needed, there has been various attempts to create simple and flexible switching matrixes. One of the most important criteria as far as a switching matrix is concerned, is its ability to leave the multiplexed traffic undistorted. Thus it is especially important that the clock in a plesiochronous bit stream remains unaffected by any switching. This problem is at least two folded. First, due to the fact that the different sit streams may have different paths through the switching matrix, they may be differently delayed in an asynchronous design. This means that the synchronisation between the different bit streams will be last. Second, due to the fact that one bit stream may be represented by two pulses (N-pulse and P-pulse as in the CEPT standard is an example thereon) and the fact that the two pulses may have different paths through the switching matrix, they may be differently delayed and subsequently the inherent plesiochronous clock will be distorted. Numerous attempts have been done to provide a switching matrix handling plesiochronous traffic, either through implementation of asynchronous techniques or through application of synchronous techniques. The design of a large switching matrix using an asynchronous technique involves severe problems due to the manufacturing timing tolerances in used components and tolerances in leap time delay in different conductor paths through the switching matrix. Since there is no way to synchronise such delays in the switching matrix, all the worst case delays will be added to each other. This will demand unreasonably high performances of the individual components and likewise unreasonably exact matching of different conductor paths through the switching matrix. These problems will be even more difficult to handle when the size of the switching matrix increases, i.e. the larger the switching matrix needs to be, the more complex it gets and the problems increase correspondingly. The situation gets even more problematic when the traffic channel goes through a chain of switching matrix units on its way to the target customer interface. Thus it is nearly impossible to build larger and more complicated switching matrixes using an asynchronous technique.

Therefore attempts have been done to use the synchronous technique for the building of switching matrixes. It is known to synchronise all incoming plesiochronous traffic channels by means of buffers before the switching matrix and then recover the original clock again after the switching matrix. In such a manner the switching matrix can be clocked with a clock corresponding to the traffic rate. An example thereon is shown in EP-A-0 226 054. In this disclosure buffers are used for adapting incoming traffic rate to the clock rate of the switching matrix. After the switching matrix buffers are provided for adapting the clock to the outgoing traffic rate. All buffer components are designed for a specific traffic rate. Furthermore there has to be a traffic dependent PLL (Phase Locked Loop) for each traffic rate to recover the original plesiochronous clock. In the system there are a lot of small switching matrixes and buffers, i.e. there are a large amount of components, which makes the system inflexible and invariable

SUMMARY

What is needed is therefore a switching arrangement able to handle plesiochronous, hierarchical traffic. Particularly a switching arrangement is needed through which multiplexed traffic will not be distorted. Particularly a switching arrangement is needed through which a plesiochronous bit stream is not affected by the switching. Moreover a switching arrangement is needed through which different bit streams do not get differently delayed through having different paths through the switching arrangement, i.e. that the synchronisation between different bit streams is maintained. Still further an arrangement is needed through which bit streams represented by two different pulses, for example the N-pulse and the P-pulse respectively as in the CEPT standard can be handed in an efficient manner and without their being differently delayed. Further yet an arrangement is needed through which the inherent plesiochronous clock will not be distorted. Furthermore an arrangement is needed which is flexible, simple, and easy to fabricate.

A system comprising a number of switching arrangements and a number of multiplexing/multiplexing means through which the above mentioned objects are achieved is also needed.

Moreover a method of switching plesiochronous, hierarchical traffic signals through which the above mentioned objects are achieved is needed.

Therefore a switching arrangement for switching plesiochrorous, hierarchical digital traffic signals carrying data on channels at different data rates is provided which comprises one synchronous switching matrix with a number of input ports and a number of output ports, each of which input ports being connectable to any one of said output ports. The arrangement further comprises one unitary reference clock with a high frequency for synchronizing and clocking signals such that signals of at least two different hierarchical levels can be switched. According to the invention a high sampling frequency is implemented, e.g. so called "oversampling". No buffering means are needed on the input side and no recovery means (for recovery of the original clock) are needed on the output side. Particularly the input signals comprise first signals carrying data at approximately 2 Mbps, second signals at a hierarchically higher level carrying data at approximately 8 Mbps. Particularly the first signals comprise so called CEPT E1 signals whereas the second signals comprise CEPT E2 signals. It can also be said that a number of E1 channels and a number of E2 channels are input. Particularly the unitary reference clock has a clocking frequency which is at least as high as 32 times the bit rate of said second signals. i.e. the signals transported with the highest bit rate. Particularly the arrangement also comprises separate asynchronous switching means for switching third signals of a higher hierarchical order than said second signals. Particularly said third signals comprise CEPT E3 signals. In a particular implementation the unitary reference clock has a sampling rate of 270 MHz. In an alternative embodiment the synchronous switching matrix allows for switching of signals of three different hierarchical levels such as E1, E2 and E3 or alternatively T1, T2 and T3. The unitary reference clock then has a sampling rate which considerably exceeds the frequency of the E3 (T3) signals.

Therefore also a system for routing plesiochronous traffic signals carrying data in channels at hierarchically different data rate levels in a telecommunications node in a radio network is provided. It comprises a number of synchronous switching matrixes with a number of non-blocking in-, and output ports for each of which a unitary reference clock is provided which has a high clocking frequency, wherein said switching matrixes route/switch at least first and second signals transporting data at a first and a second bit rate respectively, thus differing one hierarchical level from each other and further a number of multiplexing/demultiplexing means for multiplexing first signals into second signals and/or demultiplexing second signals into first signals in any desirable manner. Particularly, for at least a number of synchronous switching matrixes, asynchronous switching means are provided separately for handling third signals transporting data at a hierarchically higher level than said first and second signals. Particularly, a number of multiplexing/demultiplexing means are further provided for multiplexing/demultiplexing between second and third signals provided. In a particular implementation the first signals are CEPT E1 signals, the second signals are CEPT E2 signals. Even more particularly, in case the switching matrix is clocked with such a high frequency also higher hierarchical signals can be switched, said signals e.g. comprising E3 signals. Alternatively, when separate switching means are provided for higher bit rate signals, said signals comprise E3 signals. In a particular implementation the unitary reference clock(s) has have a clocking frequency of 270 MHz or more. In a particular implementation a processor is provided for handling the settings of at least one synchronous switching matrix and preferably an asynchronous switching means associated therewith to form a switching arrangement. In an alternative implementation there is one processor handling more than one synchronous switching matrix and more than one asynchronous switching means.

Therefore also a method of switching plesiochronous, hierarchical digital traffic signals carrying data on channels at different hierarchical data rate levels is provided. The method comprises the steps of inputting signals of two different hierarchical levels to a synchronous switching matrix using one unitary reference clock with a sampling frequency which considerably exceeds that of the hierarchically highest of said signals, providing other signals of a still higher hierarchical order to a separate asynchronous switching means such that signals of at least the lowest hierarchical orders are switched synchronously whereas signals of higher orders are switched asynchronously. Particularly the method comprises the steps of switching E1/E2 signals synchronously and switching E3 signals asynchronously. Still further the method, advantageously, comprises the step of clocking the input signals to the synchronous switching matrix with a frequency which substantially is 32 times higher than the bit rate of the second level signals, particularly the E2 signals (or T2 signals). Particularly the sampling frequency of the unitary reference clock is 270 MHz or higher. Still further the method includes the steps of multiplexing/demultiplexing signals using multiplexors/demultiplexors which are directly connected to the synchronous switching matrix which is non-blocking, i.e. any input can be connected to any output in any desirable manner.

According to the invention a switching matrix is provided which is able to handle plesiochronous traffic with one unitary system clock and more particularly it can handle both E1 and E2 signals on all traffic paths. According to the invention one unitary system clock with a high frequency is used to synchronize the switching matrix. The clocking frequency is advantageously chosen based on the criteria that the sampling rate of the incoming E1 and E2 traffic must be at least 32 times the highest traffic rate, which is E2. (It is similar for T1 and T2 traffic respectively and the corresponding also holds for other bit rates, generally the two lowest hierarchical orders.) The clock frequency sets the upper limit of the traffic rates possible to apply to a synchronous switching matrix according to the invention. With such a high sampling rate it is possible to keep the jitter and pulse distortion within acceptable limits. The paths through the switching matrix are independent of the traffic rate inserted to it due to the ability of the synchronous system to successively synchronise possible timing distortion. As referred to above, the switching matrix is non-blocking which means that every input port can be connected to any output port without any limitations.

It is an advantage of the present invention that through the inventive concept the implementation problems associated with asynchronous switching matrixes that are built to be traffic independent are avoided, i.e. it is very hard to meet the timing requirements with such asynchronous designs. In addition, it is an advantage of the invention that it is much easier to handle a synchronous design at layout and there will be no long signal paths through the design which are critical in timing and it is also an advantage of the invention that it discloses a straightforward solution as compared to arrangements using rate compensation buffers before a synchronous switching matrix that runs with a system clock on the same rate as the traffic as disclosed in the above mentioned EP-A-0 226 054. Furthermore it is an advantage of the present invention that there is no need to recover a correct clock using PLLs after the switching matrix, i.e. no receiving means are needed as well as no buffering means are needed on the input side.

BRIEF DESCRIPTION OF THE DRAWINGS

The invention will in the following be further described in a non-limiting way and with reference to the accompanying drawings in which.

DETAILED DESCRIPTION

In the detailed description to follow several embodiments will be described mainly with reference to the European Standard for Plesiochronous Hierarchical Traffic (CEPT) which traffic is built on E1 signals with a bit rate of 2048 kbps, E2 with a bit rate of 8448 kbps and E3 with a bit rate of 34368 kbps. To continue, E4 has a bit rate of 139264 kbps. It should however be clear that the inventive concept likewise applies to the American hierarchical signal format as well as it is applicable on any plesiochronous hierarchical signals.

Figure 1:
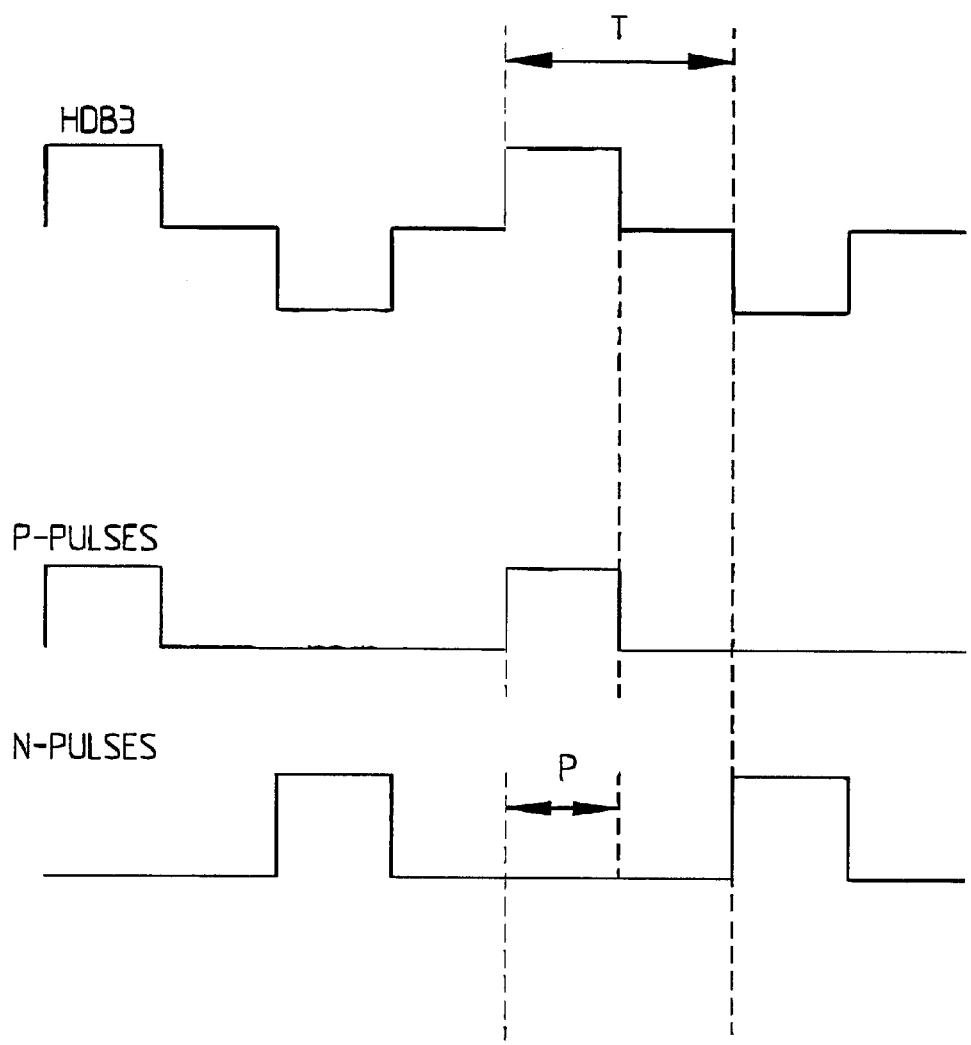
FIG. 1 schematically illustrates a bit stream comprising two different pulses as encoded to HDB3 pulses.

A bit stream comprising such traffic may be represented by two different pulses, namely the N-pulse and the P-pulse according t the CEPT standard. In FIG. 1 is illustrated a traffic channel comprising two signals, P and N which are decoded via the G.703 interface (G.703 standard by ITU-T) and encoded to HDB3 pulses.

Figure 2:
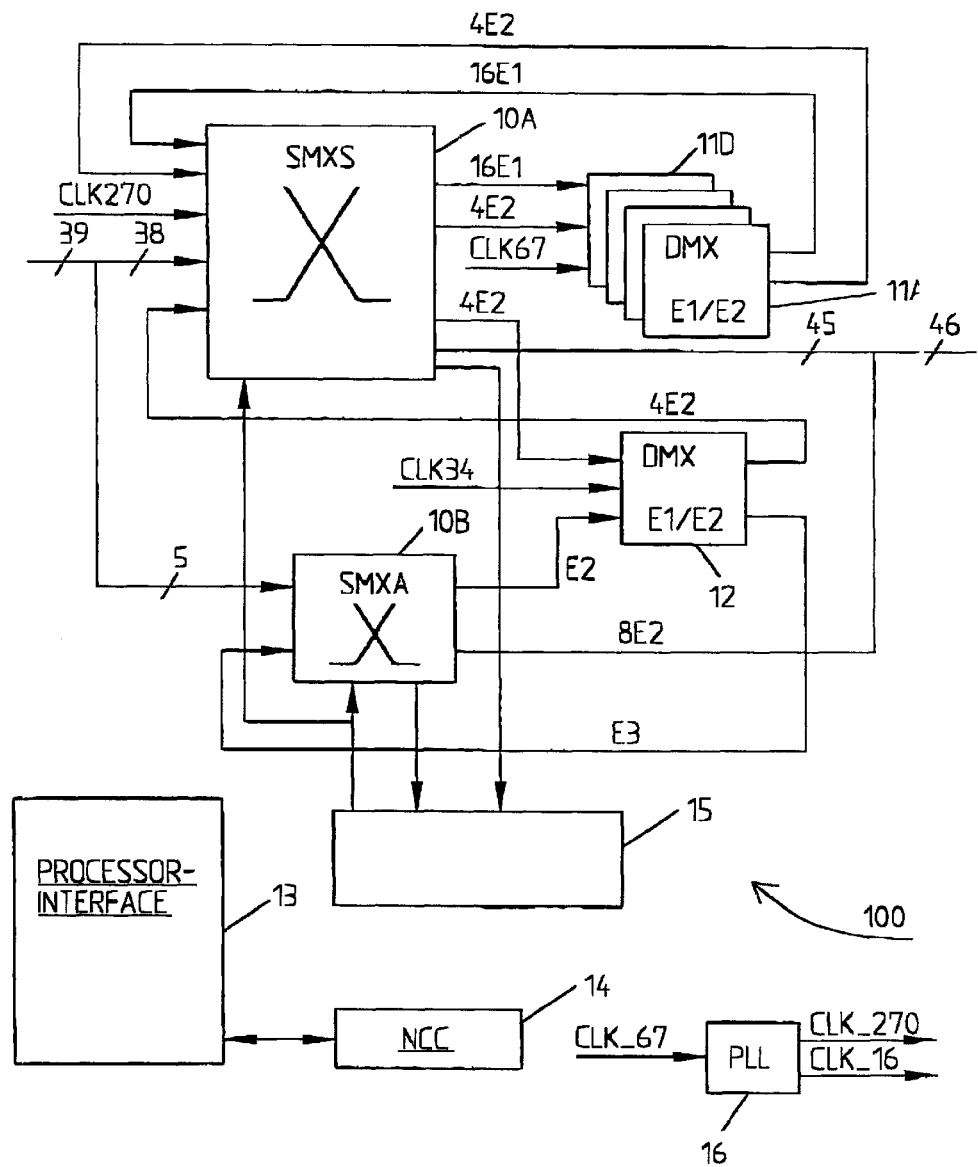
FIG. 2 illustrates one example on a system according to the invention comprising a synchronous switching matrix and asynchronous switching means and additional components, FIG. 3 schematically illustrates a first traffic case in which 16 E1 signals are input, the output being a number of E2 signals and some E1 signals, FIG. 4 schematically illustrates a second traffic case according to which 16 E1 signals are output as one E3 signal and vice versa, FIG. 5A very schematically illustrates the provision of a synchronous switching matrix according to the invention as arranged in a radio network.

In FIG. 2 a system according to the invention is illustrated which comprises a switching arrangement with a synchronous switching matrix handling E1 and E2 signals on all traffic paths, an asynchronous switching means for handling E3 signals, multiplexing means and other neighbouring blocks. It is supposed that there are number so inputs (Line Interfaces, LIC) for input to the system 100 of the present invention wherein the customer interface has been adapted to the P and N pulses as discussed above. Here 31 of the LIC:s are used for E1 or E2 traffic input to the synchronous switching matrix SMXS 10A. Some of the inputs are used in common with the asynchronous switching matrix SMXA 10B in which E3 traffic is handled, i.e. four of them are common for both and there is also a separate one for SMXA 10B. All settings in the SMXS 10A and SMXA 10B are handled by a processor interface 13 controlled by NCC 14.

A 67 MHz clock is used to, via PLL 16, generate a 270 MHz clock signal and a CLK 16 is used for processor communication with other processors etc. in any conventional manner. The clock frequency 270 MHz is selected to at least exceed the sampling rate of the incoming E2 traffic by 32 times and it is used to synchronize the SMXS 10A. Thus a unitary reference clock is used.

A number of E1 and E2 signals are incoming on different channels to SMXS 10A in which they are routed to appropriate multiplexing/demultiplexing means DMX 11A, 11B, 11C, 11D providing for multiplexing/demultiplexing between E1 and E2 traffic. In the illustrated embodiments it is supposed that 16 incoming E1 signals are multiplexed into four E2 signals in one of the DMXs whereas four E2 signals are demultiplexed into 16 E1 signals also in a selected DMX. This selection is handled by the processor 13. The 16 E1 signals and the four E2 signals are then routed back to SMXS 10A through which they are routed to the appropriate output port. It should be noted that this takes place continuously and in that, also continuously, E3 signals are directed to the asynchronous switching means SMXA 10B in which incoming E1,E3 signals are routed through the switch to appropriate multiplexing/demultiplexing means for multiplexing/demultiplexing between E2 and E3 respectively, 12, i.e. here one E2 signal is routed to DMX 12 in which it is multiplexed to form an E3 signal since E2 signals are also input from the SMXS 10A to DMX 12 and again input to SMXA 10B from where it is directed to an output port. From SMXA 10B 8 E2 signals are directed to an output port. From DMX 12 4 E2 signals care routed to SMXS 10A whereas one E3 is returned to SMXA 10B. Bit error generation means 15 are also provided. The functioning thereof is the same as in other known systems and it is merely included for illustrative purposes.

There are 39 available input ports (38 to SMXS 10A) and 45 available output ports from SMXS 10A. This figure shows an exemplary embodiment of a system 100 comprising an arrangement including SMXS 10A and SMXA 10B and a number of multiplexing/demultiplexing means. Of course it could also have been provided for more switching arrangements each comprising a synchronous switching matrix and possibly also an asynchronous switching means and additional multiplexing means etc.; a system according to the invention can be built in any desirable manner. The invention will in the following be further described with reference to a number of traffic cases.

Figure 3:
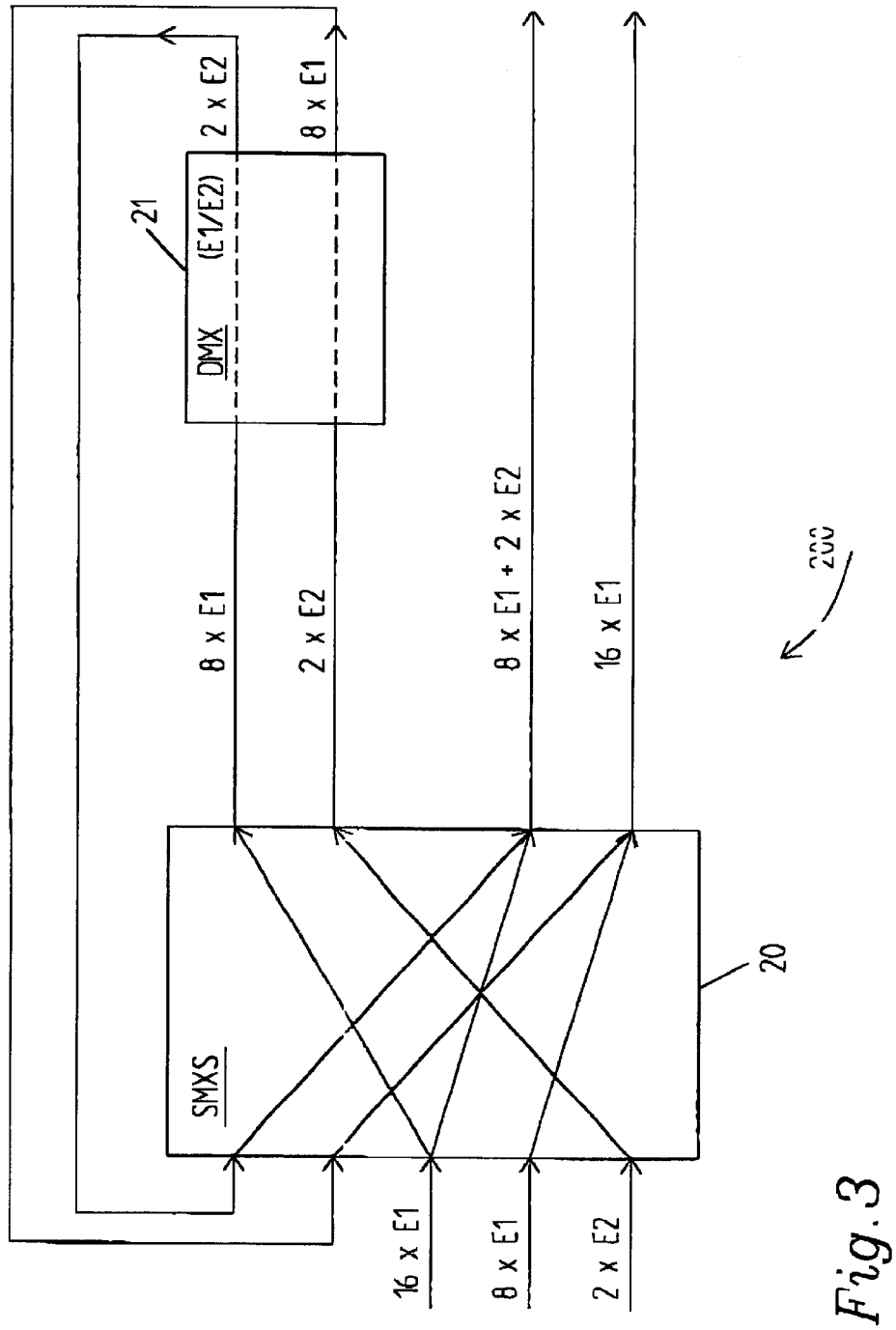

FIG. 3 schematically illustrates a system 200 used for a first traffic case I in which 16 E1 signals are input of which some are to be multiplexed into E2 signals whereas the remaining are to continue as E1 signals. The software of the processing means (not illustrated in this figure) decides which inputs are to be used. In this case 26 of 38 available inputs are used, 16 E1 signals are input one of the inputs, 8 E1 signals are input over another input and 2 E2 signals are input over still another input. In the SMXS 20 8 of the 16 E1 signals input to the first input port are routed through SMXS 20 to DMX 21 where they are multiplexed into two E2 signals which are fed back to SMXS 20. The remaining 8 E1 signals are routed through SMXS 20 together with 2 E2 signals returned from the DMX 21 to 10 of 45 optionally setup outputs of 45 available outputs. The 8 E1 signals input to SMXS 20 on another port are routed to another output together with the two E2 signals input to SMXS 20 and routed to DMX 21 in which they were multiplexed into 8 E1 signals and fed back to SMXS 20 thus resulting in 16 E1 channels being output on 16 other of the 45 available outputs. For feeding back of the two E2 signals from the DMX 21, two of four available E2 channels are used.

Figure 4:
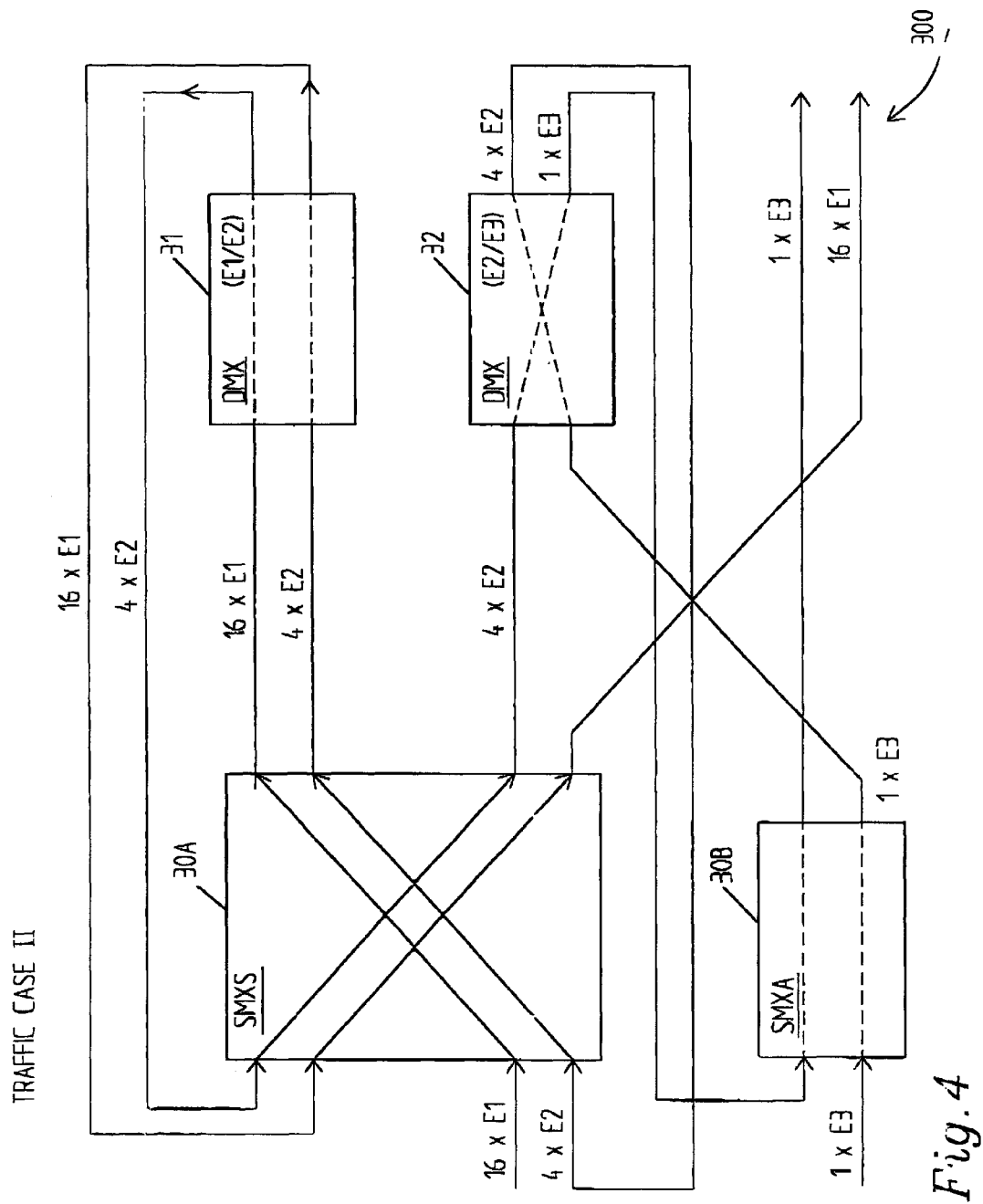

In FIG. 4 a second traffic case II is illustrated in which 16 E1 signals are to be output as one E3 signal and vice versa.

The system 300 here comprises a synchronous switching matrix SMXS 30A, asynchronous switching means SMXA 30B and multiplexing/demultiplexing means DMX 31 for multiplexing/demultiplexing between E1 and E2 signals respectively and multiplexing/demultiplexing means DMX 32 for multiplexing/demultiplexing between E2 and E3 signals. Thus, here 16 E1 signals are input on one of 31 available inputs to SMXS 30A. They are routed through SMXS 30A to DMX 31 in which they are multiplexed into 4 E2 signals which are fed back to SMXS 30A and routed through it to DMX 32 where they are multiplexed into 1 E3 signal which is forwarded to SMXA 30B, routed through it and output on an optional output of 8 available outputs.

For the opposite case, when 1 E3 signal is to be output as 16 E1 signals, it is here illustrated how 1 E3 signal is input to SMXA 30B on one of 5 available inputs. It is routed through SMXA 30B to DMX 32 where it is demultiplexed into 4 E2 signals which are routed to SMXS 30A from which they are routed to DMX 31 in which the 4 E2 signals are demultiplexed into 16 E1 signals which are fed back to SMXS 30A and routed through it to one of 45 available outputs on which thus 16 E1 signals are output.

Figure 5A:
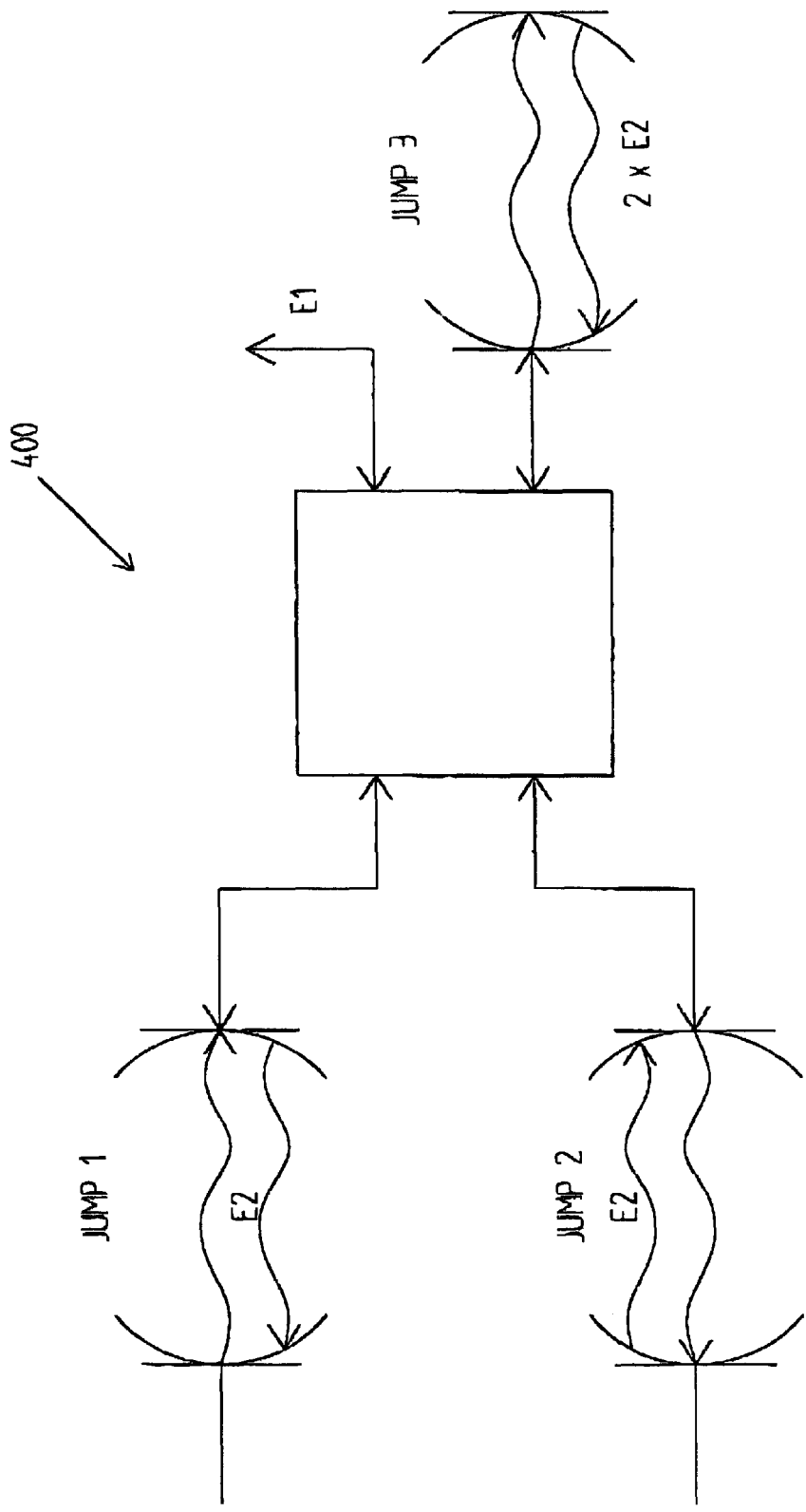
FIG. 5B is the third traffic case of FIG. 5A showing more in detail the switching matrix and multiplexing means.

In a further traffic case, case III, two incoming E2 signals are to result in two outgoing E2 channels whereas one E1 signal is to be dropped. This will be described with reference to FIG. 5B. However, in FIG. 5A is very schematically illustrated a system 400 for providing this as arranged in a radio network receiving signals or traffic through the air is illustrated through jumps 1–3 with drop of an E1 channel.

Figure 5B:
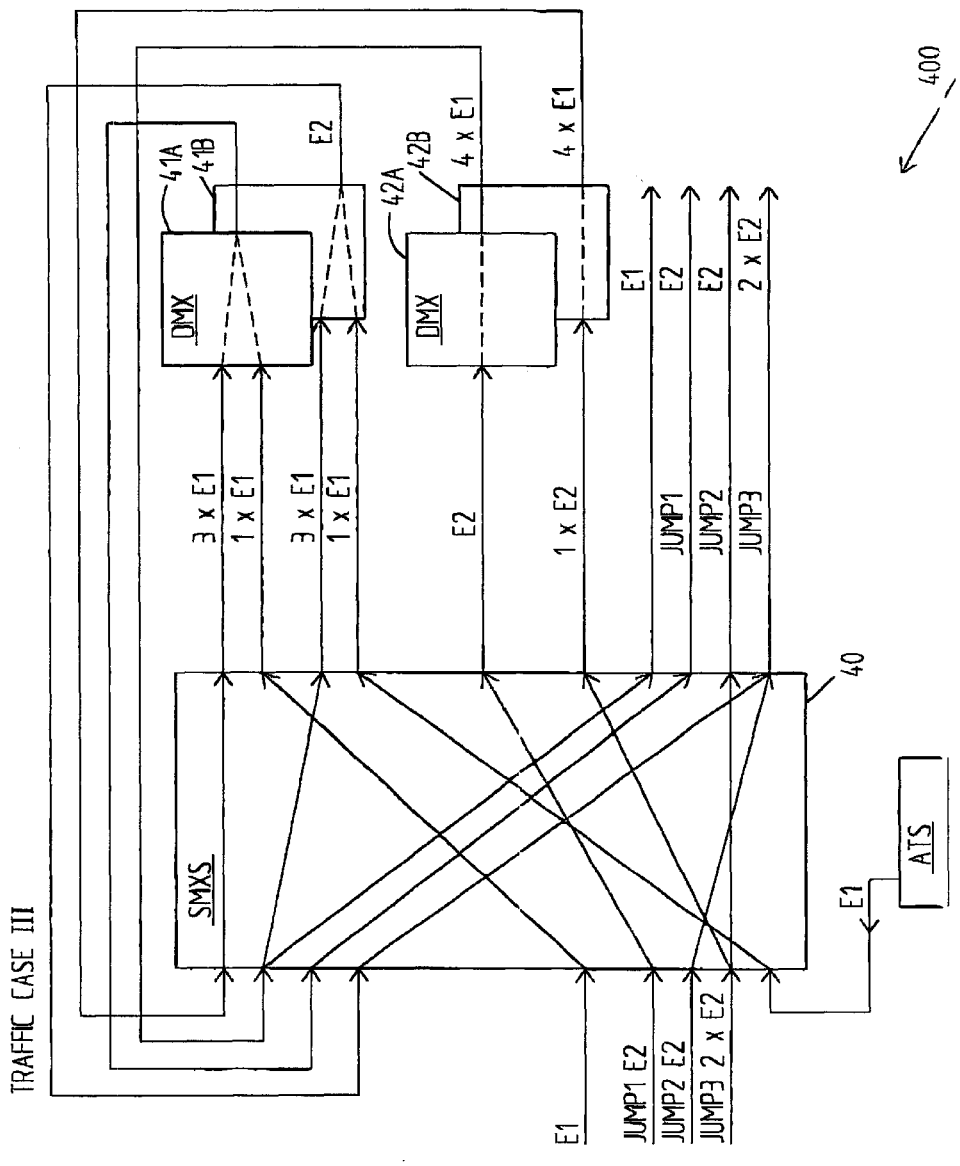

In FIG. 5B the system 400 is illustrated more in detail. It comprises a synchronous switching matrix SMXS 40, multiplexing/demultiplexing means 41A, 41B and further multiplexing/demultiplexing means DMX 42A, 42B. Further an alarm indicating signal device AIS is shown which generates an E1 signal. 5 of 38 available input channels will be used for input of signals in the transmitting and receiving direction respectively whereas 5 of 45 available output channels will be used in the receiving and transmitting direction respectively.

In the transmitting direction, it supposed that jump 1 comprising an E2 signal is input to SMXS 40 from which it is routed to DMX 42A in which it is demultiplexed into 4 E1 signals which are fed back to the synchronous switching matrix SMXS 40 in which 1 E1 signal is routed one of the outputs and dropped whereas the remaining 3 E1 signals are routed through the SMXS 40 to DMX 41B where it is multiplexed into 1 E2 signal (together with the E1 signal from AIS) which is fed back to the SMXS 40 and routed through it to an output channel together with the input E2 signal from jump 2 and output as 2 E2 signals forming jump 3.

In the other direction, in the receiving direction, 1 E1 signal is input to SMXS 40, routed through it to DMX 41A in which it is multiplexed with 3 E1 signals originating from two input E2 signals corresponding to jump 3, into 1 E2 signal which is fed back to SMXS 40 through which it is routed to one of the available outputs as 1 E2 signal (jump 1) The two E2 signals coming from jump 3 are input to SMXS 40 on another of the five available inputs, routed through SMXS 40 such that one of the 1 E2 signals goes directly through SMXS 40 to one of the outputs as jump 2 whereas the other is routed to multiplexing/demultiplexing means 42B in which it is demultiplexed into 4 E1 signals which are fed back to SMXS 40, routed through it to DMX 41A and multiplexed into 1 E2 signal which is fed back to SMXS 40 again, routed through to 17 and output as an E2 signal, jump 1 The fourth E1 signal (of the four E1 signals from DMX 42B) is not shown since it contains no information and actually originates from the AIS.

Figure 6A:
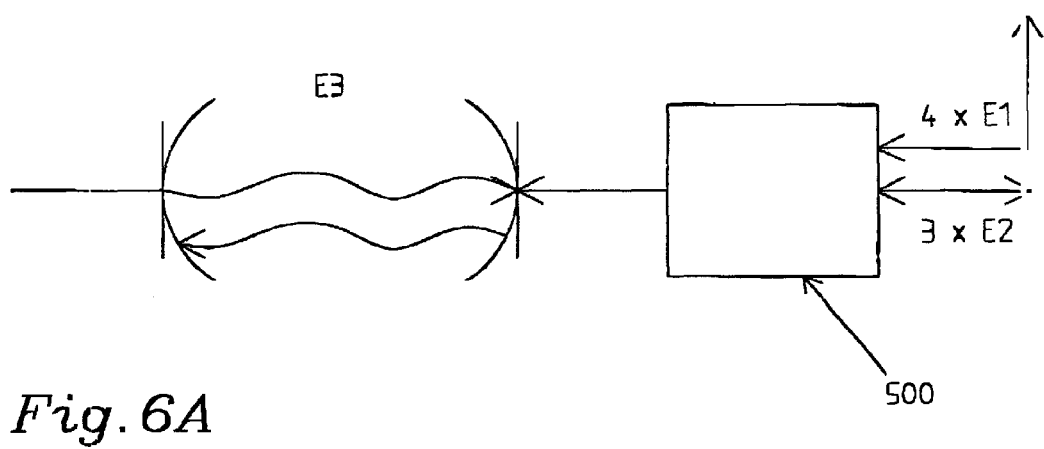
FIG. 6A shows very schematically a fourth implementation of a system according to the invention.
Figure 6B:
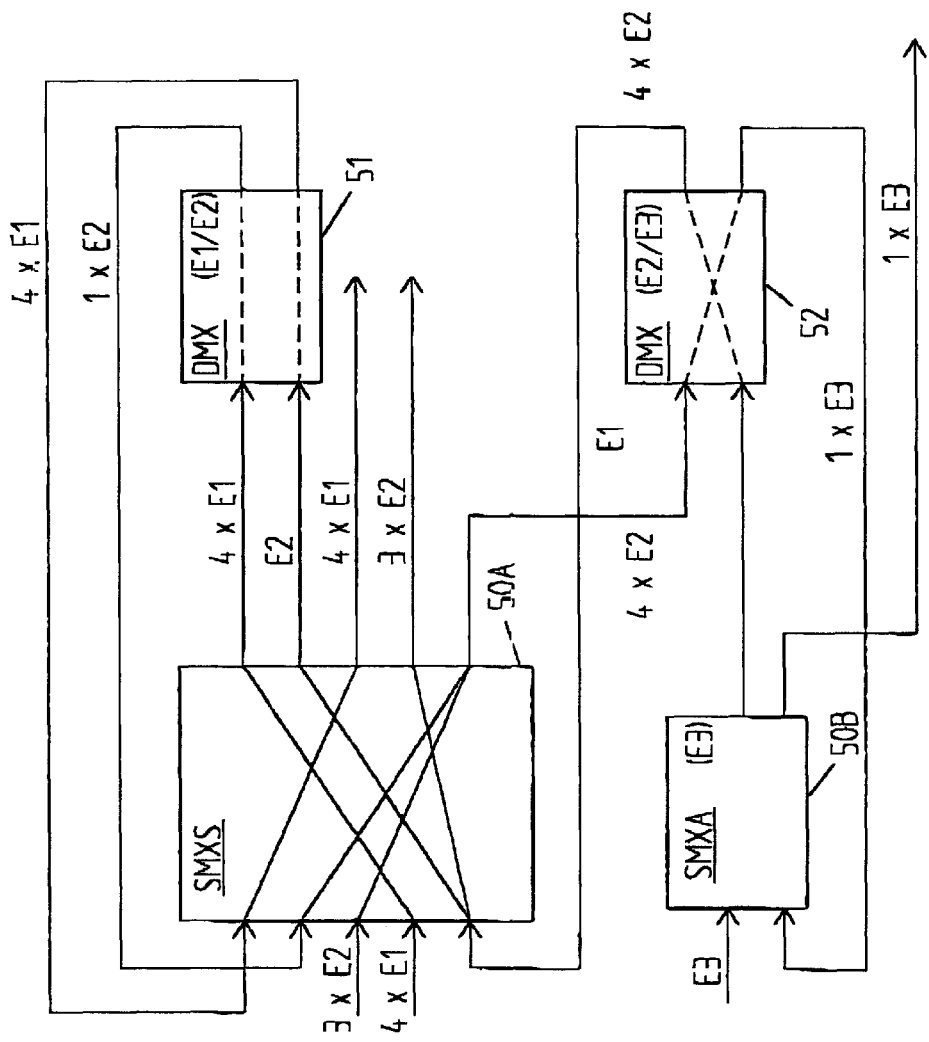
FIG. 6B shows the system of FIG. 6A more in detail for a fourth traffic case.

Still another traffic case IV is given in FIGS. 6A, 6B. In FIG. 6A is very schematically the arrangement of the system 500 illustrated for input of an E3 signal, dropping of 4 E1 signals and output of 3 E2 signals and vice versa. The system is more thoroughly illustrated in FIG. 6B according to which it comprises a synchronous switching matrix SMXS 50A, an asynchronous switching means SMXA 50B, multiplexing/demultiplexing means DMX 51 for handling E1/E2 traffic and further multiplexing/demultiplexing means DMX 52 for handling E2/E3 traffic. For the input of 4 E1 signals and 3 E2 signals 7 of 31 available input channels are used for input to the synchronous switching matrix 50A whereas for input of one E3 signal an asynchronous switching means 50B is needed for the input of the E3 signal, one of 5 possible input channels is used. For the output of 4 E1 signals and 3 E2 signals 7 of 45 available output channels are used from the synchronous switching matrix 50A whereas for output of 1 E3 signal 1 of 8 available output channels of the asynchronous switching means 50B is used. The procedures in the receiving direction and the transmitting direction respectively will be more thoroughly described in traffic flow diagrams 7A, 7B.

Figure 7A:
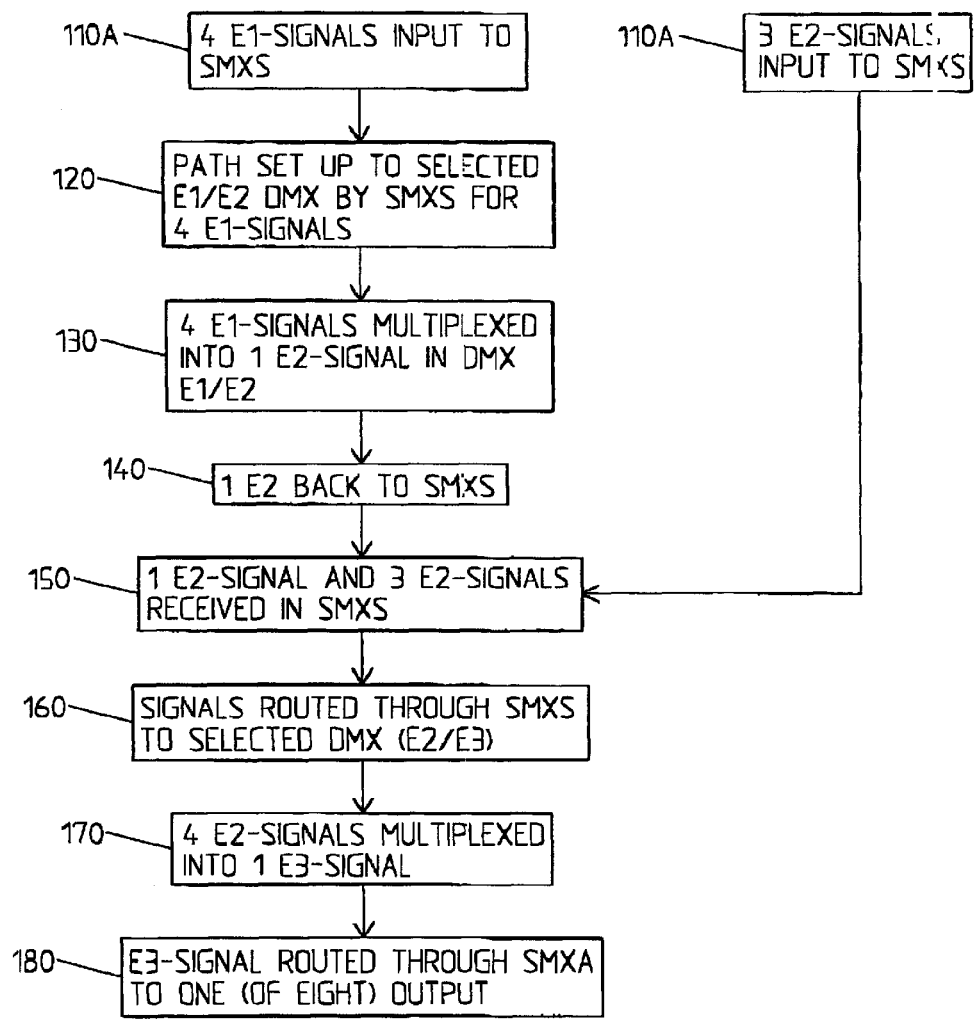
FIG. 7A is a flow diagram schematically describing the traffic case of FIGS. 6A, 6B in the receiving direction.

In FIG. 7A is schematically illustrated how the four E1 signals are input to SMXS 50A, 110A. A path is then setup to a selected multiplexing/demultiplexing means DMX 51, for handling E1/E2 traffic which is done by the SMXS 50A for the 4 E1 signals, 120. The four E1 signals are then multiplexed into 1 E2 signal ir DMX 51, 130. One E2 signal is then routed back to SMXS 50A, 140. It should bet clear that this takes place continuously as well as 3 E2 signals continuously are input to SMXS 50A, 110B, and thus 1 E2 signal and 3 E2 signals are received in SMXS 50A, 150. The signals are then routed through SMXS 50A to selected multiplexing/demultiplexing means DMX 52 which handle E2 and E3 traffic, 160 and in which 4 E2 signals are multiplexed into 1 E3 signal, 170, which then is routed through SMXA to one (of eight available) output, 180.

Figure 7B:
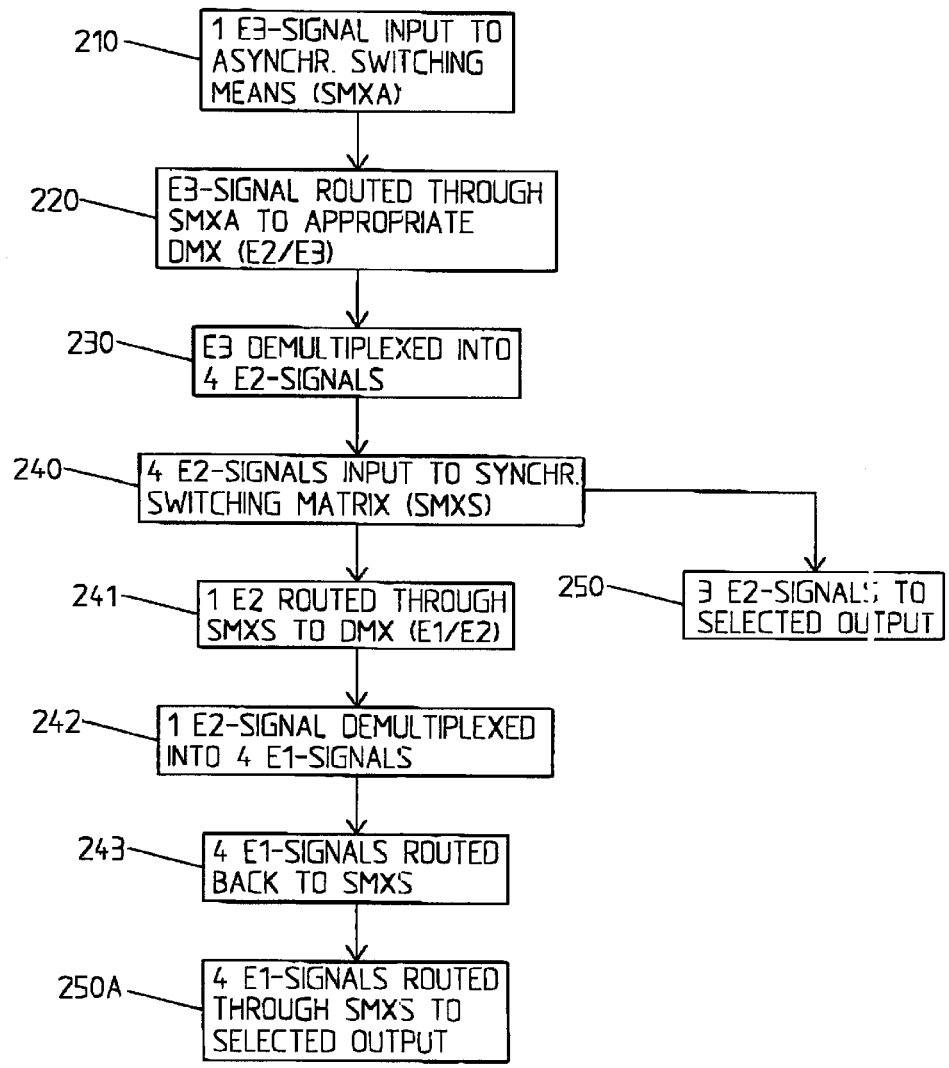
FIG. 7B is a flow diagram schematically illustrating a fourth traffic case in the transmitting direction.

When E3 traffic is received in one of five available inputs in the asynchronous switching means 50B, 210, (FIG. 7B), the E3 signal is routed through SMXA 50B to an appropriate DMX for E2/E3 traffic, 220. In this case it is DMX 52 in which the E3 signal is demultiplexed into 4 E2 signals, 230, which are routed to the synchronous switching matrix SMXS 50A, 240. Of the 4 E2 signals, 1 E2 signal is routed through SMXS 50A to DMX 51, 241, in which the E2 signal is demultiplexed into 4 E1 signals, 242, which are routed back to SMXS 50B, 243 and subsequently the 4 E1 signals are routed through SMXS 50B to a selected output, 250A. The three other E2 signals which were input to SMXS 50A according to the step 240, are routed through SMXS 50A to selected outputs, 450B. For the output of the 4 E1 signals and the 3 E2 signals, 7 of 45 available output channels are used whereas for output of the E3 signal, 1 of 8 possible output channels is used. The processing means (not illustrated in this figure) contain controlling software which indicates which of the outputs that are to be used.

It should be clear that the four traffic cases are merely some examples on how a system/arrangement according to the present invention can be used. Traffic case IV is a most common traffic case but there is no limitation to how the system can be used and synchronous, asynchronous, multiplexing/demultiplexing means can be arranged in any appropriate manner or be used in an appropriate manner for routing traffic in different manners.

Also in other aspects the invention is not limited to the explicitly illustrated embodiments but it can be varied in a number of ways within the scope of the appended claims.

What is claimed is:

1. A switching arrangement for switching plesiochronous hierarchical digital traffic signals carrying data on channels at different data rates comprising:

a synchronous switching matrix having a plurality of input ports and a plurality of output ports, each input port capable of being connected to any one of the output ports; and a unitary reference clock having a frequency for synchronizing and clocking input signals such that input signals of at least two different hierarchical levels can be switched, wherein the unitary reference clock has a frequency substantially greater than the bit rate of a highest bit rate input signal.

2. The arrangement according to claim 1, wherein the input signals comprise:

at least one first signal carrying data at approximately 2M bits/sec; and at least one second signal carrying data at a hierarchically higher level than the first hierarchical level at approximately 8M bits/sec.

3. The arrangement according to claim 2, wherein the at least one first signal comprises CEPT E1 signals and the at least one second signal composes CEPT E2 signals carried in a plurality of E1 channels and E2 channels, respectively.

4. The arrangement according to claim 2, wherein the unitary reference clock has a frequency at least thirty-two times the bit rate of a highest bit rate input signal.

5. The arrangement according to claim 4, wherein the unitary reference clock has a frequency of 270 megahertz.

6. The arrangement according to claim 4, further comprising an asynchronous switching means for switching at least one third signal carrying data on a higher hierarchical level than that of the at least one second signal.

7. The arrangement according to claim 6, wherein the at least one third signal is a CEPT E3 signal.

8. The arrangement according to claim 1, wherein the synchronous switching matrix switches signals having three different hierarchical levels.

9. A system for routing and switching plesiochronous hierarchical signals carrying data in channels at hierarchically different data rate levels in a telecommunications node in a radio network comprising:

a plurality of synchronous switching matrixes having a plurality of non-blocking input and output ports; and a unitary reference clock coupled to the synchronous switching matrixes for routing and switching at least one first signal and at least one second signal carrying data at a first bit rate and a second bit rate respectively and having differing hierarchical levels, wherein the unitary reference clock has a frequency substantially greater than the bit rate of a highest bit rate input signal.

10. The system according to claim 9, further comprising:

an asynchronous switching means for routing and switching at least one third signal carrying data at a hierarchically higher level than that of the at least one first signal and the at least one second signal; and a plurality of multiplexing/demultiplexing means for multiplexing the at least one first signal into the at least one second signal and demultiplexing the at least one second signal into the at least one first signal.

11. The system according to claim 10, wherein for at least one of the synchronous switching matrixes, asynchronous switching means are provided for routing and switching the at least one third signal.

12. The system according to claim 11, further comprising a plurality of multiplexing/demultiplexing means for multiplexing and demultiplexing between the at least one first and second signals and at the least one third signal.

13. The system according to claim 10, wherein the at least one first signal is a CEPT E1 signal and the at least one second signal is a CEPT E2 signal.

14. The system according to claim 11, wherein the at least one third signal is a CEPT E3 signal.

15. The system according to claim 11, wherein the unitary reference clock has a frequency of 270 megahertz.

16. The system according to claim 10, further comprising:

a processor for managing the settings in at least one of the synchronous switch matrixes and in the asynchronous switching means.

17. A method of switching plesiochronous, hierarchical digital traffic signals carrying data on channels at different hierarchical data rate levels, comprising the steps of:

receiving input signals having at least two different hierarchical levels; and synchronously routing and switching the input signals in a synchronous switching matrix using a unitary reference clock having a sampling frequency substantially greater than a bit rate of a highest hierarchical level signal of the received input signals.

18. The method of claim 17, further comprising the steps of:

providing hierarchically higher level signals to an asynchronous switching means;

and switching the hierarchically higher level signals asynchronously.

19. The method of claim 17, wherein input signals having a lower hierarchical level comprise E1 and E2 signals and input signals having a higher hierarchical level are E3 signals.

20. The method of claim 19, wherein the unitary reference clock has a frequency at least thirty-two times higher than a bit rate of the E2 signals.

21. The method of claim 20, wherein the sampling frequency of the unitary reference clock is 270 megahertz.

22. The method of claim 17, further comprising the step of:

multiplexing and demultiplexing the input signals using multiplexers and demultiplexers coupled to a non-blocking synchronous switching matrix.

* * * * *